United States Patent [19]

Koslov et al.

[11] Patent Number: 4,488,178

[45] Date of Patent: Dec. 11, 1984

[54] CCD DEFECT CORRECTION WITHOUT DEFECT LOCATION MEMORY

[75] Inventors: Joshua L. Koslov; Theodor M. Wagner, both of Princeton, N.J.

[73] Assignee: RCA Corporation, New York, N.Y.

[21] Appl. No.: 444,357

[22] Filed: Nov. 24, 1982

[51] Int. Cl.³ .................. H04N 5/14; H04N 3/14
[52] U.S. Cl. .................. 358/163; 358/213; 360/38.1
[58] Field of Search ............... 358/163, 280, 285, 213, 358/294; 360/38.1

[56] References Cited

U.S. PATENT DOCUMENTS

| 3,904,818 | 9/1975 | Kovac | 178/7.1 |
| 4,167,755 | 9/1979 | Nagumo | 358/213 |
| 4,189,751 | 2/1980 | Nagumo | 358/213 |
| 4,193,093 | 3/1980 | Clair | 358/160 |

FOREIGN PATENT DOCUMENTS 54-56722  5/1979  Japan.

Primary Examiner—Howard W. Britton
Assistant Examiner—John K. Peng
Attorney, Agent, or Firm—E. M. Whitacre; W. H. Meise; H. I. Steckler

[57] ABSTRACT

A TV camera comprises a pair of CCD imagers subject to defects. Defect detection is done by comparing signals from the imagers, thus saving the expense of a defect location memory and also detecting more kinds of defects than one would detect by just comparing one signal to a fixed reference. As a result, CCD imagers with defects can be used thus increasing production yield of such imagers.

6 Claims, 2 Drawing Figures

CCD DEFECT CORRECTION WITHOUT DEFECT LOCATION MEMORY

BACKGROUND OF THE INVENTION

The present invention relates to using CCD (charge coupled device) imagers in a television camera, and more particularly, to using such imagers that have defects.

Present CCD imagers suffer from low yields due to imperfections and defects in the integrated circuit chips from which they are fabricated. Various schemes have been used to correct for the signal disturbances that result from such defects. For example U.S. Pat. No. 3,904,818 shows a system that in effect does dropout compensation. The system detects when a photosensor provides excessive dark current, and if so, substitutes a signal that is the average of signals provided by photosensors surrounding the defective one. However, an average of signals from surrounding photosensors may not be a close enough approximation to be satisfactory. Also, other photosensors in the area may be affected by the defect and averaging may not produce an acceptable correction.

Other schemes, such as shown in U.S. patent application Ser. No. 242,265, filed Mar. 10, 1981, in the names of W. H. Meise and R. A. Dischert, use two imagers and two ROMs (read only memories) programmed with defect locations of the imagers.

Normally the output signal is derived from both imagers for best signal-to-noise ratio. When a defective photosensor is about to be read from one imager, the output signal is derived from just the other imager. However, this scheme may require complex and expensive circuitry, e.g. the ROMs and their associated circuits.

Still another scheme is shown in Japanese Patent (Kokai) No. 54-56722. As shown therein a flaw detector, which comprises a threshold circuit, receives the output signal from one of two imagers. When the output signal exceeds the peak white level or goes below black level, thereby indicating a defective photosensor, the threshold circuit provides an output signal to perform a switching function so that the video signal output for the entire circuit is now derived from the second imager. However, this circuit cannot detect grey level defects that result in incorrect video signals between the black and white levels.

It is therefore desirable to have a defect compensation circuit that has high resolution, low cost, and detects grey level as well as severe defects.

SUMMARY OF THE INVENTION

An imaging method and apparatus comprising imaging a scene onto a plurality of imagers, said imagers being subject to defects, obtaining signals from said imagers to allow producing a visible image, comparing signals from said imagers to determine which signals are not representative of the scene due to said defects, and adding said signals together to form an output signal except when a signal from a defect is present and otherwise blocking a signal derived from a defect from forming said output signal.

DETAILED DESCRIPTION

Figure 1:
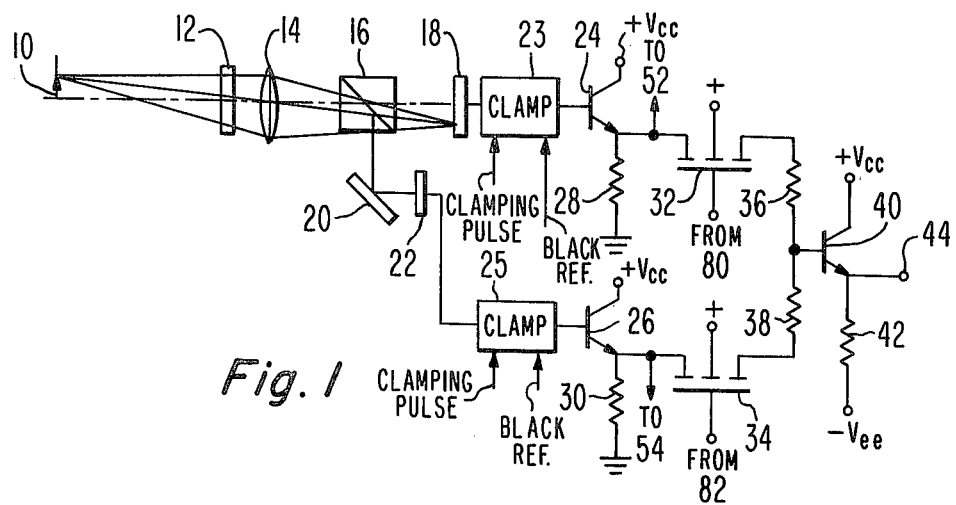
FIG. 1 shows a circuit diagram of a portion of a video camera.

FIG. 1 shows an object 10, which reflects ambient light through an infra-red filter 12, which reduces the infra-red pick-up of the imagers, through a focussing lens 14 into a beam splitter 16. Splitter 16 comprises two contiguous triangular cross-section prisms with a half-silvered mirror disposed therebetween. One-half of the light goes to CCD imager 18, which lies in the focal plane of lens 14, while the other half of the light is reflected from inverting mirror 20 to correct for the inversion of the half-silvered mirror, and then goes to CCD imager 22, which also lies in the focal plane of lens 14. Mirror 20 ensures that the image on imagers 18 and 22 are in the same sense. Mirror 20 can be eliminated if imager 22 is clocked in reverse with respect to imager 18. If desired imagers 18 and 22 can be horizontally offset from one another by one-half a photosensor width for improved resolution and reduced aliasing.

The initial photosensor of each line of each of imagers 18 and 22 is covered up. Thus the output signal from these photosensors comprises a black level signal. A black level signal derived in this fashion will change with temperature exactly as the black level from the remaining photosensors on the line since they are on the same substrate.

A clock generator (not shown) synchronously causes scanning to take place within imagers 18 and 22 so that both imagers are simultaneously providing a signal from corresponding photosensors. The signals from imagers 18 and 22 are respectively applied to clamp circuits illustrated as blocks 23 and 25, which clamp circuits receive a clamping pulse from a generator (not shown) when the covered photosensors are being read out. A clamping voltage from, e.g. a potentiometer (not shown), is also applied to the clamping circuits 23 and 25. Since the time constant of the clamping circuits is a few horizontal line periods, the dark current for the entire line is held constant at the clamping voltage. The clamped signals, from clamping circuits 23 and 25, is then respectively applied to emitter followers comprising transistors 24 and 26 and resistors 28 and 30. Most of the time there will be good signals from both imagers 18 and 22, and therefore it is desired to add the signals from the two imagers together for improved signal-to-noise ratio. To achieve this, the signals from transistors 24 and 26 are applied to FET (field effect transistor) switches 32 and 34 respectively, which switches are normally in the ON (passes signal) state due to the biasing of their gates. The output signals from switches 32 and 34 are applied to an adder including equal value resistors 36 and 38. Resistors 36 and 38 should have equal value so as to obtain a 3 db signal-to-noise ratio improvement when signals from both imagers are present. Further, resistors 36 and 38 can comprise the ON resistance of FETs 32 and 34. The output of the adder is coupled to an emitter follower including transistor 40 and resistor 42. The video output signal is provided at output terminal 44.

When one of the imagers has a defective photosensor, the gate bias on the appropriate FET switch can be changed so that the switch is in the OFF (blocks signal) state. The present invention generates FET switching (gate biasing) pulses by comparing the two signals from the imagers without the use of a defect location memory. It is based upon the nature of defects that have been observed in the imagers: either a defective pixel is brighter than it should be (as seen in white lines or spots in the picture) or it is darker (dark or black lines or spots).

The following algorithm will correct defects, assuming that only one of the imagers has a defect at any particular location, which condition can be satisfied by careful selection of the imager pairs.

If one imager output signal is higher than the other, the one that is higher is assumed to be a bright defect, and only the other imager output signal is used, unless the lesser output signal is black, in which case it is assumed to be a black defect, and the higher output signal is used.

Figure 2:
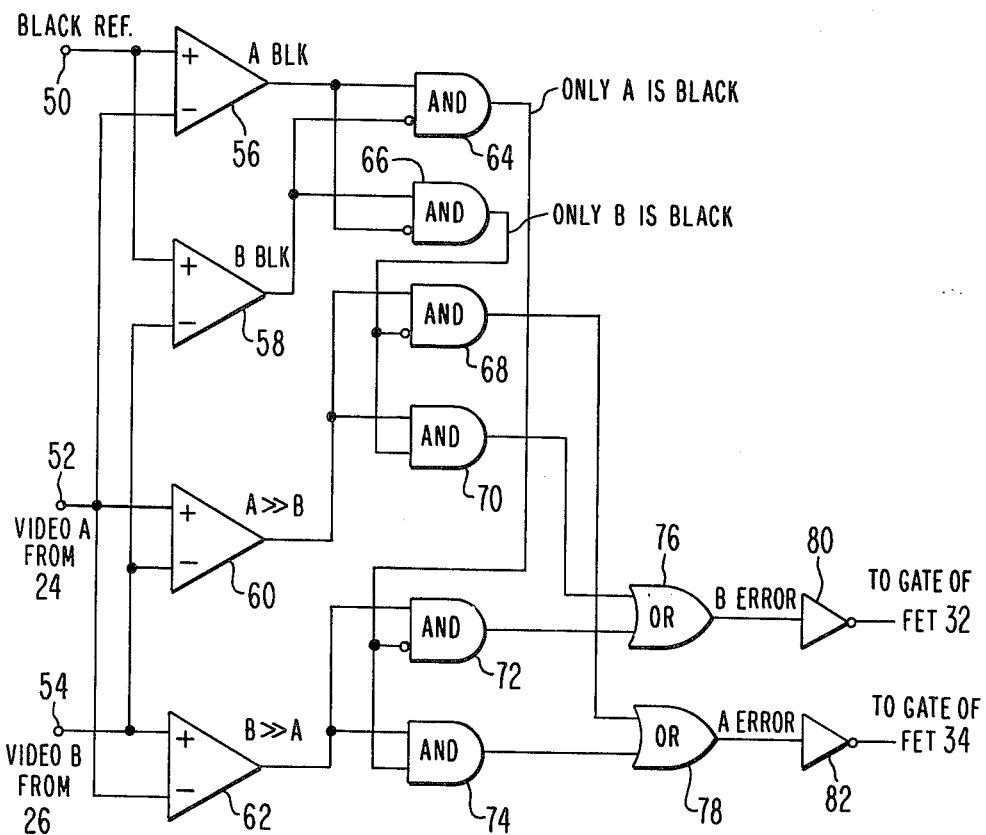
FIG. 2 shows a logic diagram of a driving circuit for switches present in FIG. 1.

FIG. 2 shows the circuitry for implementing the above algorithm. A black reference signal, which comprises the clamping voltage applied to clamps 23 and 25, is received at input terminal 50. The black reference signal is applied to the non-inverting input of comparators 56 and 58. The video signal from the emitter of transistor 24 (video A) is received at input terminal 52 and applied to the inverting inputs of comparators 56 and 62 and to the non-inverting input of comparator 60. The video signal from the emitter of transistor 26 (video B) is received at input terminal 54 and applied to the non-inverting input of comparator 62 and the inverting inputs of comparators 58 and 60.

Comparator 56 provides a ONE output signal when video signal A is less than black level, which output signal is called "A is black", to AND gate 64 and to the inverting input of AND gate 66. Similarly comparator 58 provides a ONE output signal when video signal B is less than black level, which output signal is called "B is black", to the inverting input of gate 64 and to gate 66. The output signal from gate 64 is ONE when only A is black and is applied to the inverting input of AND gate 72 and to AND gate 74. Similarly, the output signal from gate 66 is ONE when only B is black and is applied to the inverting input of AND gate 68 and to AND gate 70.

Comparator 60 provides a ONE output signal called "A is greater than B" to gates 68 and 70 when signal A exceeds signal B by a threshold amount. Similarly, comparator 62 provides a ONE output signal called "B is greater than A" to gates 72 and 74 when signal B exceeds signal A by a threshold amount, which threshold is determined by an external bias voltage applied to one of the input signals of each comparator. The threshold levels allow for noise always causing slight differences between signals A and B from imagers 18 and 22.

The output signal from gate 70 is ONE if A is greater than B and if only B is black. This means that B is a black error. The output signal is applied to OR gate 76. The output signal from gate 68 is ONE if A is greater than B and if not only B is black, i.e. there are no black errors, or A is black, or both A and B are black. This output signal is called "A is a white error", which includes not only A being actually white, but A is black but greater than B. The output signal from gate 68 is applied to OR gate 78.

Similarly, the output signal of gate 74 is ONE if B is greater than A and only A is black. This means that A is a black error. The output signal is applied to gate 78. The output signal from gate 72 is ONE if B is greater than A and if not only A is black, i.e. there are no black errors, or B is black, or both A and B are black. This output signal is called "B is a white error", which includes not only B being actually white, but B is black but greater than A. The output signal from AND gate 72 is applied to OR gate 76.

The output signal from OR gate 76, called "B error", is ONE if there is either a black or white error in signal B. Similarly, the output signal from OR gate 78, called "A error", is ONE if there is either a black or white error in signal A.

The following truth table describes the operation of FIG. 2.

| Case | Output of 60 | Output of 62 | Output of 56 | Output of 58 | Output of 78 | Output of 76 |
|---|---|---|---|---|---|---|
| 1 | 0 | 0 | 0 | 0 | 0 | 0 |
| 2 | 0 | 0 | 0 | 1 | 0 | 0 |
| 3 | 0 | 0 | 1 | 0 | 0 | 0 |
| 4 | 0 | 0 | 1 | 1 | 0 | 0 |
| 5 | 0 | 1 | 0 | 0 | 0 | 1 |
| 6 | 0 | 1 | 0 | 1 | (Impossible) | |
| 7 | 0 | 1 | 1 | 0 | 1 | 0 |
| 8 | 0 | 1 | 1 | 1 | 0 | 1 |
| 9 | 1 | 0 | 0 | 0 | 1 | 0 |
| 10 | 1 | 0 | 0 | 1 | 0 | 1 |
| 11 | 1 | 0 | 1 | 0 | (Impossible) | |
| 12 | 1 | 0 | 1 | 1 | 1 | 0 |
| 13 | 1 | 1 | 0 | 0 | All Impossible Input Combinations to Gates 76 & 78 | |
| 14 | 1 | 1 | 0 | 1 | | |
| 15 | 1 | 1 | 1 | 0 | | |
| 16 | 1 | 1 | 1 | 1 | | |

Certain combinations of input signals A and B cannot arise. These are:

Case 6: B is greater than A, and B is black, but A is not black, since A cannot be both bigger and smaller than A.

Case 11: A is much greater than B, and A is black, but B is not black. This is just the reverse of case 6.

Case 13-16: A is much greater than B, and B is much greater than A.

Since FET switches 32 and 34 are N-channel devices, the "A error" and "B error" signals are inverted in inverters 82 and 80 respectively in FIG. 2 before going to the FETS, so that when "A error" is ONE, FET 34 is turned off and when "B error" is ONE, FET 32 is turned off.

It will be noted that when no defects are present and both FETs are providing signal, the high input impedance of transistor 40 does not load down resistors 36 and 38. When FET 32 or 34 is open due to a defect, transistor 40 still does not load down resistor 36 or 38 respectively. Thus the output voltage at terminal 44 remains a constant for constant illumination of imagers 18 and 22.

The delay in the video paths from the two imagers must be matched to the delay in the comparator/logic circuitry.

What is claimed is:

1. An imaging method comprising imaging a scene onto a plurality of imagers, said imagers being subject to defects, comparing signals from said imagers to determine which are not representative of the scene due to said defects, and adding said signals together to form an output signal except when a signal from a defect is present and when said signal from a defect is present blocking said signal derived from a defect from forming said output signal.

2. An apparatus comprising a plurality of imagers subject to defects, imaging means for imaging a scene onto said plurality of imagers, comparing means for comparing signals from said imagers to determine which are not representative of the scene due to said defects. and adding means for adding said signals together to form an output signal except when a signal from a defect is present and when said signal from a defect is present blocking said signal derived from a defect from forming said output signal.

3. Apparatus as claimed in claim 2, wherein said plurality is two.

4. Apparatus as claimed in claim 3, wherein said comparing means comprises means for determining that the greater of the two imager signals is a bright defect unless the lesser signal is black wherein the lesser signal is determined to be a black defect.

5. Apparatus as claimed in claim 2, wherein each of said imagers have a covered portion, and further comprising clamping means for clamping the signals derived from said covered portions to a selected black level.

6. Apparatus comprising a pair of CCD imagers subject to defects and having covered portions, a lens and a beam splitter disposed in front of said imagers for imaging a scene thereon, a pair of clamps respectively coupled to the outputs of said imagers for clamping the imager signals to a selected black level during said covered portion, comparing means for comparing said imager signals including means for determining that the greater of the two imager signals is a bright defect unless the lesser signal is black wherein the lesser signal is determined to be a black defect, and adding means for adding said imager signals together to form an output signal except when a signal from a defect is present and when a signal from a defect is present blocking said signal derived from a defect from forming said output signal.

\* \* \* \* \*